United States Patent
Farooq et al.

(10) Patent No.: US 12,233,813 B2
(45) Date of Patent: Feb. 25, 2025

(54) AIRBAGS INFLATABLE VEHICLE FORWARD OF BUMPER

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/360,333

(22) Filed: Jul. 27, 2023

(65) Prior Publication Data

US 2025/0033593 A1 Jan. 30, 2025

(51) Int. Cl.
*B60R 21/36* (2011.01)
*B60R 19/20* (2006.01)

(52) U.S. Cl.
CPC ............ *B60R 21/36* (2013.01); *B60R 19/205* (2013.01)

(58) Field of Classification Search
CPC .............. B60R 21/36; B60R 19/205; B60R 2021/23386; B60R 21/00; B60R 21/34
See application file for complete search history.

(56) References Cited

U.S. PATENT DOCUMENTS

| | | |
|---|---|---|
| 5,431,463 A | 7/1995 | Chou |
| 6,883,631 B2 | 4/2005 | Hu et al. |
| 8,033,356 B2 | 10/2011 | Kim |
| 10,471,927 B1 * | 11/2019 | Gupta ..................... B60R 21/36 |
| 11,535,182 B2 | 12/2022 | Baccouche et al. |
| 12,043,192 B2 * | 7/2024 | Nagasawa ........... B60R 21/2338 |
| 2005/0087998 A1 | 4/2005 | Curry et al. |
| 2005/0269805 A1 | 12/2005 | Kalliske et al. |
| 2006/0169517 A1 * | 8/2006 | Mishra .................. B60R 19/205 |
| | | 180/274 |

(Continued)

FOREIGN PATENT DOCUMENTS

| | | | |
|---|---|---|---|
| CN | 105946782 A | * 9/2016 | ......... B60R 21/2338 |
| CN | 111660995 A | * 9/2020 | |

(Continued)

OTHER PUBLICATIONS

Reference 574, DE-10356572-A1, Machine Translation of Specification (Year: 2005).*

(Continued)

*Primary Examiner* — Paul N Dickson
*Assistant Examiner* — Matthew Joseph Ganci
(74) *Attorney, Agent, or Firm* — Frank A. MacKenzie; Brooks Kushman P.C.

(57) ABSTRACT

A vehicle includes a vehicle bumper and a plurality of airbag assemblies each fixed directly to the vehicle bumper. Each airbag assembly includes an airbag inflatable below the vehicle bumper and upwardly vehicle-forward of the vehicle bumper from an uninflated position to an inflated position. The airbag assemblies are spaced from each other when the airbags are in the uninflated position. An external tether is fixed to two of the airbags and extends along the vehicle bumper from one of the two airbags to the other of the two airbags when the airbags are in the uninflated position.

15 Claims, 7 Drawing Sheets

(56) References Cited

U.S. PATENT DOCUMENTS

| | | | |
|---|---|---|---|
| 2009/0152041 A1* | 6/2009 | Kim | B60R 21/36 180/274 |
| 2022/0134981 A1* | 5/2022 | Baccouche | B60R 19/205 293/107 |
| 2022/0306029 A1 | 9/2022 | Nagasawa | |

FOREIGN PATENT DOCUMENTS

| | | | | |
|---|---|---|---|---|
| DE | 10213178 A1 | * | 2/2003 | B60R 21/36 |
| DE | 10356572 A1 | * | 6/2005 | B60R 21/36 |
| DE | 102005012719 A1 | * | 9/2006 | B60R 21/0134 |
| KR | 20100092194 A | | 8/2010 | |

OTHER PUBLICATIONS

Hashimoto, CN-105946782-A, Machine Translation of Specification (Year: 2016).*
Sinnhuber, DE-102005012719-A1, Machine Translation of Specification (Year: 2005).*
Reference 178, DE-10213178-A1, Machine Translation of Specification (Year: 2003).*
Zhang, CN-111660995-A, Machine Translation of Specification (Year: 2020).*

* cited by examiner

AIRBAGS INFLATABLE VEHICLE FORWARD OF BUMPER

BACKGROUND

The Global Technology Regulation (GTR) and the New Car Assessment Program (NCAP) specify leg-injury criteria for pedestrian protection. The regulations are aimed at reducing the impact force to the legs of a pedestrian by a vehicle bumper during certain vehicle-pedestrian impacts.

Some vehicles, such as light duty trucks and sport utility vehicles (SUVs), for example, may have a bumper height that could lead to an uneven impact on the femur and/or tibia of the pedestrian by the vehicle bumper during certain vehicle-pedestrian impacts. For example, light duty trucks may have bumper heights to provide ground clearance to clear speed bumps, curbs, parking blocks, inclined driveway ramps, hills, rough roads, etc. Some vehicles with such bumper heights also have off-road capabilities that preclude having any components below the vehicle bumper. As such, a design for the vehicle front-end is investigated for pedestrian leg impact energy management while addressing ground clearance requirements.

DETAILED DESCRIPTION

With reference to the Figures, wherein like numerals indicate like parts throughout the several views, a vehicle 10 includes a vehicle bumper 12 and a plurality of airbag assemblies, specifically lower airbag assemblies 14, each fixed directly to the vehicle bumper 12. Each lower airbag assembly 14 includes an airbag 18 inflatable below the vehicle bumper 12 and upwardly vehicle-forward of the vehicle bumper 12 from an uninflated position to an inflated position. The lower airbag assemblies 14 are spaced from each other when the airbags 18 are in the uninflated position. An external tether 20 is fixed to two of the airbags 18 and extends along the vehicle bumper 12 from one of the two airbags 18 to the other of the two airbags 18 when the airbags 18 are in the uninflated position.

When the airbags 18 are in the uninflated position, the lower airbag assemblies 14 do not meaningfully affect the ride height of the vehicle bumper 12. The location of the airbag assembly on the vehicle bumper 12 to deploy the airbags 18 below the vehicle bumper 12 and upwardly vehicle-forward of the vehicle bumper 12 provides freedom in packaging and styling of the vehicle bumper 12. The extension of the external tether 20 along the vehicle bumper 12 from one of the airbags 18 to the other of the airbags 18 in the uninflated position allows for the packaging of the lower airbag assemblies 14 directly on the vehicle bumper 12. Since the external tether 20 is fixed to two of the airbags 18, the external tether 20 in the inflated position distributes loading across the two airbags 18 and resists movement of the airbag 18 vehicle-rearward and below the vehicle bumper 12 in the event the airbag 18 is impacted, e.g., during certain vehicle impacts. Specifically, the tether and the airbags 18 in combination in the inflated position are pinched between an impacted object and the vehicle bumper 12 in the event the airbag 18 is impacted, e.g., during certain vehicle impacts.

Figure 1:
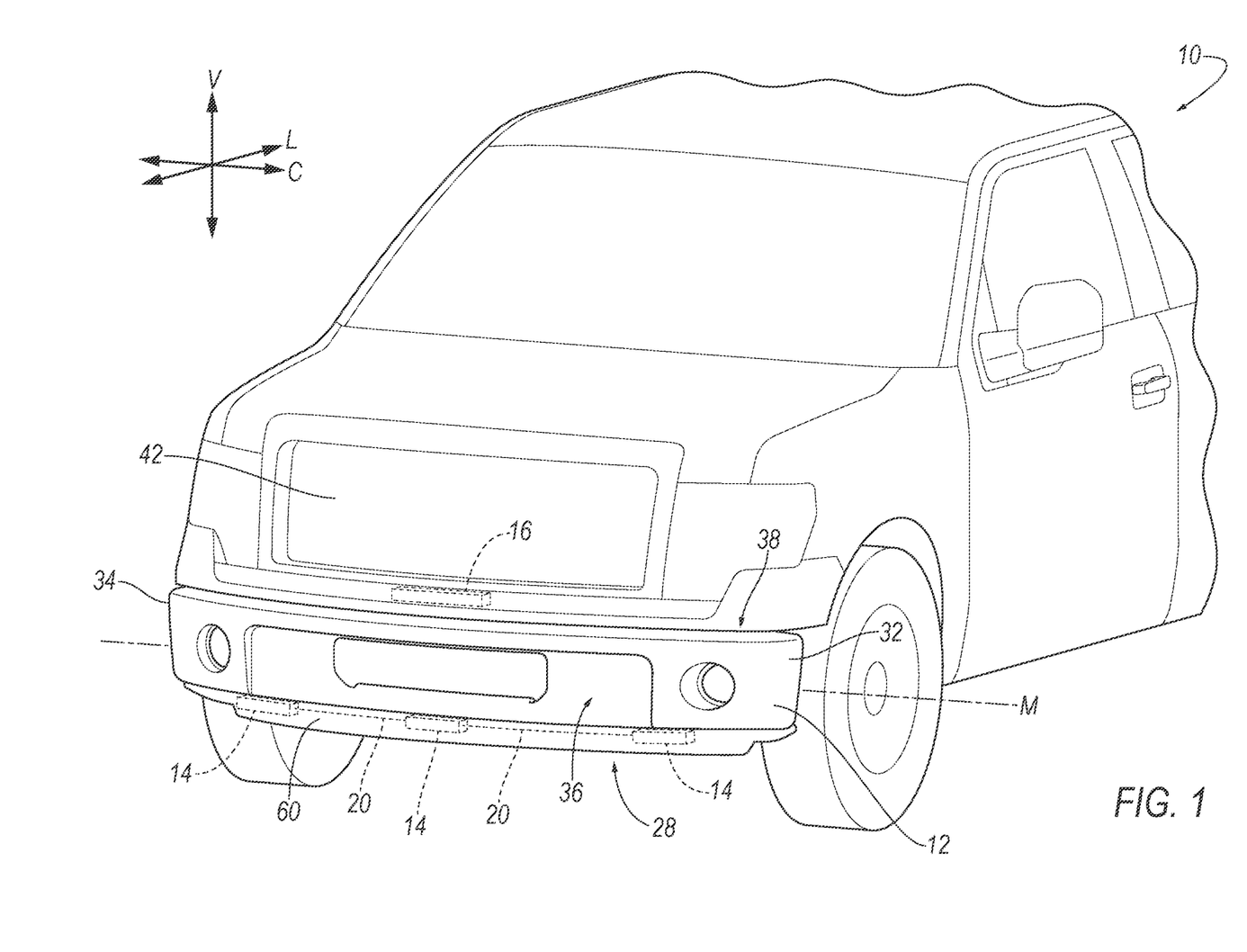
FIG. 1 is a perspective view of a vehicle including a bumper assembly having airbag assemblies.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, as an example, may have a relatively high ride height. With reference to FIG. 1, the vehicle 10 defines a vehicle-longitudinal axis L extending between a front end (not numbered) and a rear-end (not numbered) of the vehicle 10. The vehicle 10 defines a vehicle-lateral axis C extending cross-vehicle from one side to the other side of the vehicle 10. The vehicle 10 defines a vertical axis V. The vehicle-longitudinal axis L, the vehicle-lateral axis A, and the vertical axis V are perpendicular relative to each other.

With reference to FIG. 1, the vehicle 10 includes a vehicle frame 22 and a vehicle body (not numbered). The vehicle body and the vehicle frame 22 may have a body-on-frame construction (also referred to as a cab-on-frame construction) in which the vehicle body and vehicle frame 22 are separate components, i.e., are modular, and the vehicle body is supported on and affixed to the vehicle frame 22. In the example shown in the Figures, the vehicle 10 has a body-on-frame construction. As another example, the vehicle body and the vehicle frame 22 may be of a unibody construction in which the vehicle frame 22 is unitary with the vehicle body (including frame rails 24, pillars, roof rails, etc.). In other examples, the vehicle frame 22 and vehicle body may have any suitable construction. The vehicle frame 22 and vehicle body may be of any suitable material, for example, steel, aluminum, and/or fiber-reinforced plastic, etc.

The vehicle body includes body panels (not numbered). The body panels may include structural panels, e.g., rockers, pillars, roof rails, etc. The body panels may include exterior panels. The exterior panels may present a class-A surface, e.g., a finished surface exposed to view by a customer and free of unaesthetic blemishes and defects. The body panels include, e.g., a roof panels, doors, fenders, hood, decklid, etc. The vehicle body may define a passenger cabin to house occupants, if any, of the vehicle 10.

Figure 2:
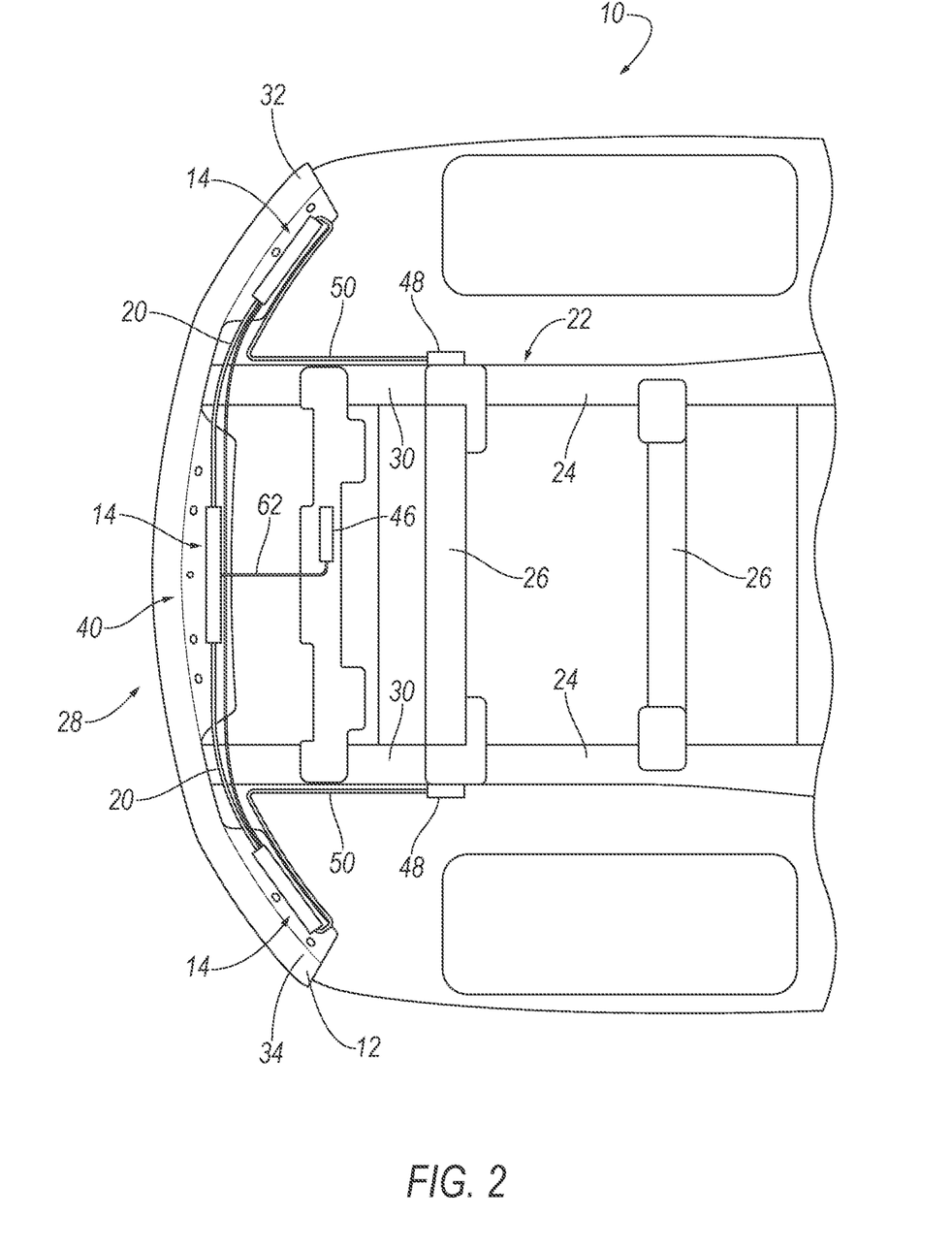
FIG. 2 is a bottom view of the vehicle with the airbag assemblies in an uninflated position.
Figure 4:
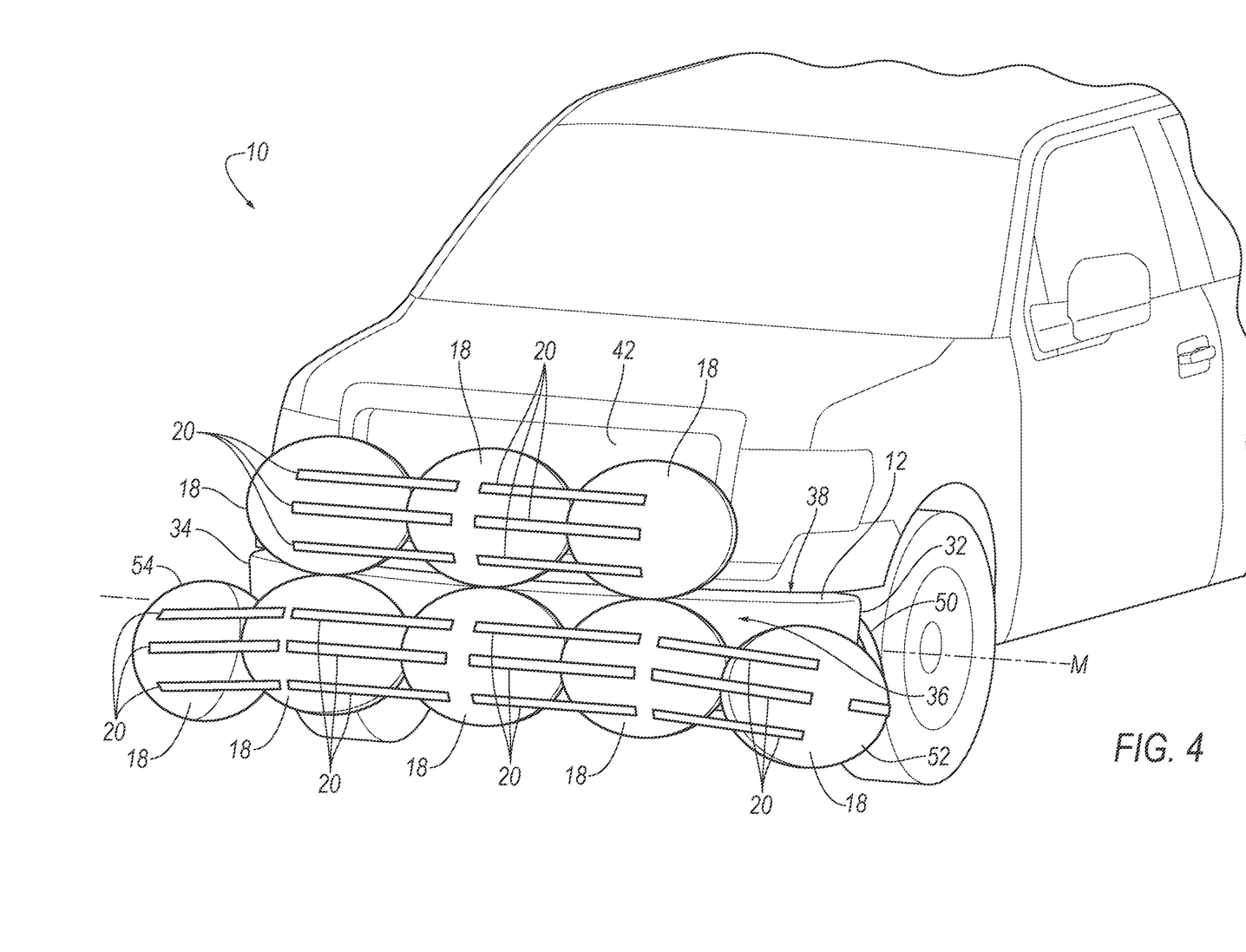
FIG. 4 is a perspective view of the vehicle with the airbag assemblies in an inflated position.

With reference to FIGS. 2 and 4, the example vehicle frame 22 shown in the Figures includes frame rails 24 and cross beams 26. The frame rails 24 are elongated along the vehicle-longitudinal axis L. The frame rails 24 are spaced from each other cross-vehicle, i.e., along the vehicle-lateral axis C. The cross beams 26 of the vehicle frame 22 extend from one frame rail 24 to the other frame rail 24 transverse to the vehicle-longitudinal axis A.

The vehicle frame 22 may include frame rails 24 that are elongated along the vehicle-longitudinal axis L. The frame rails 24 extend to the front end of the vehicle 10 and may extend from the front end of the vehicle 10 to the rear end of the vehicle 10. The frame rails 24 may be components of a body-on-frame construction, as described above, and in such an example the vehicle body is supported on and connected to the frame rails 24, e.g., with cab-mount brackets. The frame rails 24 may, for example, include energy absorbers configured to absorb energy during certain vehicle-to-vehicle impacts. For example, the frame rails 24 may include crush-initiators, crush cans 30, crush zones, etc. The frame rail 24 may be of any suitable material such as metal (steel, aluminum, etc.), fiber-reinforced plastic, etc.

The vehicle 10 includes a bumper assembly 28 including the vehicle bumper 12, the lower airbag assemblies 14, and the upper airbag assembly 16. The bumper assembly 28 may include other components such as lights, appliques, an air dam 60, etc. The bumper assembly 28 is supported by the vehicle frame 22. In the example shown in the Figures, bumper assembly 28 is supported by the frame rails 24. In other words, the weight of bumper assembly 14 is borne by the frame rails 24. Specifically, vehicle bumper 12 may be elongated from one frame rail 24 to the other frame rail 24. The vehicle bumper 12 may be elongated along the vehicle-lateral axis A. The vehicle bumper 12 is connected to the frame rails 24, i.e., directly connected to the frame rails 24 or indirectly connected to the frame rails 24 through an intermediate component such as a bracket, fastener components, etc. As an example, the vehicle bumper 12 may be connected to the frame rail 24 by fastener, welding, etc. As set forth above, in some examples the frame rails 24 may include energy absorbers and in examples in which the energy absorbers are on front ends of the frame rails 24, the vehicle bumper 12 may be directly connected to the energy absorbers. For example, in the example shown in the Figures, the vehicle bumper 12 is directly connected to the crush cans 30.

Figure 3:
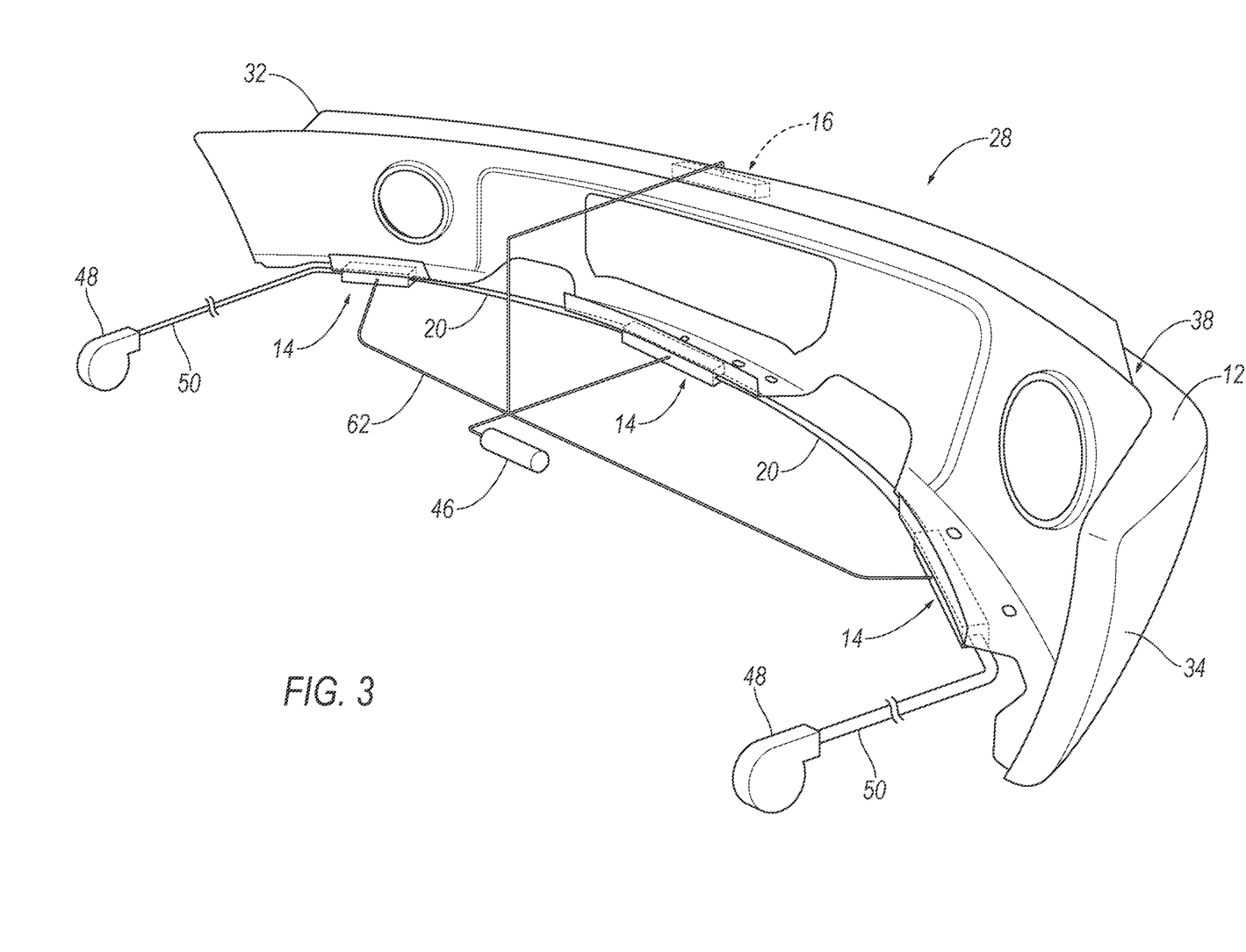
FIG. 3 is a perspective view of the bumper assembly.

The vehicle bumper 12 extends transversely to the frame rails 24, e.g., in a cross-vehicle direction C. With reference to FIGS. 1-3, the vehicle bumper 12 is elongated along the cross-vehicle direction C. The vehicle bumper 12 includes a leftmost end 32 and a rightmost end 34 spaced cross-vehicle from each other. The vehicle bumper 12 is supported by the vehicle frame 22, i.e., the weight of the vehicle bumper 12 is borne by the vehicle frame 22. The bumper assembly 28 may be a front bumper assembly, as shown in the Figures. In other words, the bumper assembly 28 may be at a front of the vehicle 10 and, in such examples, the vehicle bumper 12 extension is operable for frontal collisions of the vehicle 10.

The vehicle bumper 12 may have a class-A surface, i.e., a surface specifically manufactured to have a high-quality, finished aesthetic appearance free of blemishes. The class-A surface faces vehicle-forward. As an example, the class-A surface may be chromed or have a chrome-like appearance. The vehicle bumper 12 may be any suitable material, e.g., metal such as steel, aluminum, etc.; plastic such as fiber-reinforced plastic, etc.

The vehicle bumper 12 has a front face 36 that faces vehicle-forward. The front face 36 is upright and may be generally vertical. The vehicle bumper 12 may have a top face 38 and a bottom face 40 with the front face 36 between the top face 38 and the bottom face 40. The top face 38 is spaced vertically from the bottom face 40. The top face 38 is above the front face 36 and the bottom face 40 is below the front face 36. The top face 38 and the bottom face 40 may both extend vehicle-rearward from the front face 36. In the example shown in the Figures, the bottom face 40 is the lowermost horizontally planar surface of the vehicle bumper 12 and the top face 38 is the uppermost horizontally planar surface of the vehicle bumper 12.

The vehicle bumper 12, as an example, may impact the knee of a pedestrian impact test leg form during a standardized test. The leg form may be a flexible pedestrian leg impactor (Flex-PLI) leg form. Example regulations that can use the leg form include Global Technical Regulation (GTR), ECE R127 and Korean Motor Vehicle Safety Standards (KMVSS). Example new car assessment programs that can use the leg form include EuroNCAP, CNCAP, and ANCAP.

The vehicle 10 includes a grill 42 at the front end of the vehicle 10. The grill 42 is above bumper assembly 28. The grill 42 may be spaced from bumper assembly 28 or abutting bumper assembly 28. The grill 42 may be a component of the vehicle body and may be supported on other components of the vehicle body.

As set forth above, the vehicle 10 includes a plurality of lower airbag assemblies 14. The vehicle 10 includes at least one upper airbag assembly 16. The lower airbag assemblies 14 and/or the upper airbag assembly 16 may be components of bumper assembly 28. In the example shown in the Figures, bumper assembly 28 includes three lower airbag assemblies 14 and one upper airbag assembly 16. In other examples, bumper assembly 28 may include any suitable number of two or more lower airbag assemblies 14 and any suitable number of one or more upper airbag assemblies.

Each airbag assembly 14, 16 includes one or more airbags 18. Each airbag assembly 14, 16 may include a housing 44 that houses the airbag(s) 18 of the respective airbags 18 assembly/assemblies in the uninflated position and supports the airbag(s) 18 in the inflated position. In such examples, the airbag(s) 18 may be rolled and/or folded to fit within the housing 44 in the uninflated position. The housing 44 may be of any suitable material, e.g., a rigid polymer, a metal, a composite, or a combination of rigid materials. The airbag housing 44 may, for example, include clips, threaded fasteners, etc., for attaching the housing 44 to the vehicle bumper 12, as described further below. In other examples that do not include airbag housings, the airbags 18 may be fixed to the vehicle bumper 12 in any suitable way, e.g., by direct connection of the airbag 18 to the vehicle bumper 12 with a cover concealing the airbag 18 in the uninflated position. The vehicle 10 includes an inflator 46 that inflates one or more airbags 18 to the inflated position, as described further below. In the example shown in the Figures, the inflator 46 is fixed directly to the vehicle frame 22 and inflates all of the airbags 18. In other examples, one or more inflators 46 may be in the housings 44 of the airbag assemblies.

With reference to FIG. 4, the lower airbag assemblies 14 and the upper airbag assembly 16 in combination include a plurality of airbags 18. In the example shown in the Figures, two of the lower airbag assemblies 14 include two airbags 18 in the respective housing 44, one of the lower airbag assemblies 14 includes one airbag 18 in the respective housing 44, and the upper airbag assembly 16 includes three airbags 18. The airbags 18 in the inflated position are vehicle-forward of the front face 36 of the vehicle bumper 12. Specifically, the airbags 18 of the upper airbag assembly 16 may abut each other in the inflated position and the airbags 18 of the lower airbag assemblies 14 may abut each other and may abut the airbags 18 of the upper airbag assembly 16 in the inflated position. Since the airbags 18 of the lower airbag assemblies 14 and the upper airbag assembly 16 are vehicle-forward of the vehicle bumper 12 in the inflated position, the airbags 18 may control the kinematics of pedestrians during certain vehicle impacts. As an example, the airbags 18 are positioned to impact a pedestrian impact test leg form during a standardized test. Since the airbags 18 of the lower airbag assemblies 14 extend below the vehicle bumper 12 and vehicle-forward of vehicle bumper 12 and abut the airbags 18 of the upper airbag assembly 16, the airbags 18 of the lower airbag assemblies 14 and the upper airbag assembly 16 distribute loading of certain vehicle impacts across the leg form. During impact with an object, the object pins the impacted airbag(s) 18 against the front face 36 of the vehicle bumper 12. In some examples, including the example shown in the Figures, a tether retractor 48 and a retractable tether 50 may position the airbag 18 relative to the vehicle bumper 12.

The airbag assemblies 14, 16 are each fixed directly to the vehicle bumper 12. The lower airbag assemblies 14 are fixed directly to the bottom face 40 of the vehicle bumper 12 and the upper airbag assembly 16 is fixed directly to the top face 38 of the vehicle bumper 12. In examples in which the airbag assemblies 14, 16 include housings 44, the housings 44 are directly fixed to the vehicle bumper 12, specifically the bottom face 40 or the top face 38, with, for example, threaded fasteners, brackets, adhesive, etc. The vehicle bumper 12 and the airbag assemblies 14, 16 are parts-in-assembly, i.e., move together as a unit and are assembled as a unit to the rest of the vehicle 10 (e.g., by attaching the vehicle bumper 12 to the frame rails 24).

The lower airbag assemblies 14 are spaced from each other when the airbags 18 are in the uninflated position, as shown in FIGS. 2 and 3. Specifically, in the example shown in the Figures, one of the lower airbag assemblies 14 is on the vehicle bumper 12 in a middle of the vehicle 10 and the other two lower airbag assemblies 14 are spaced cross-vehicle therefrom vehicle-outboard of the middle of bumper assembly 28. In the example shown in the Figures, the lower airbag assembly 14 in the middle of the vehicle 10 includes one airbag 18 and the other two lower airbag assemblies 14 include two airbags 18. The leftmost of the upper airbag assemblies 16 includes a leftmost one of the airbags 18 (hereinafter "the leftmost airbag 52") and the rightmost of the airbag assemblies includes a rightmost one of the airbags 18 (hereinafter "the rightmost airbag 54"). The airbags 18 include at least one airbag 18 between the leftmost airbag 52 and the rightmost airbag 54. Specifically, in the example shown in the Figures, the airbags 18 include three airbags 18 between the leftmost airbag 52 and the rightmost airbag 54. The leftmost airbag 52 may extend vehicle-outboard of the leftmost end 32 of the vehicle bumper 12 and the rightmost airbag 54 may extend vehicle-outboard of the rightmost end 34 of the vehicle bumper 12.

Figure 5:
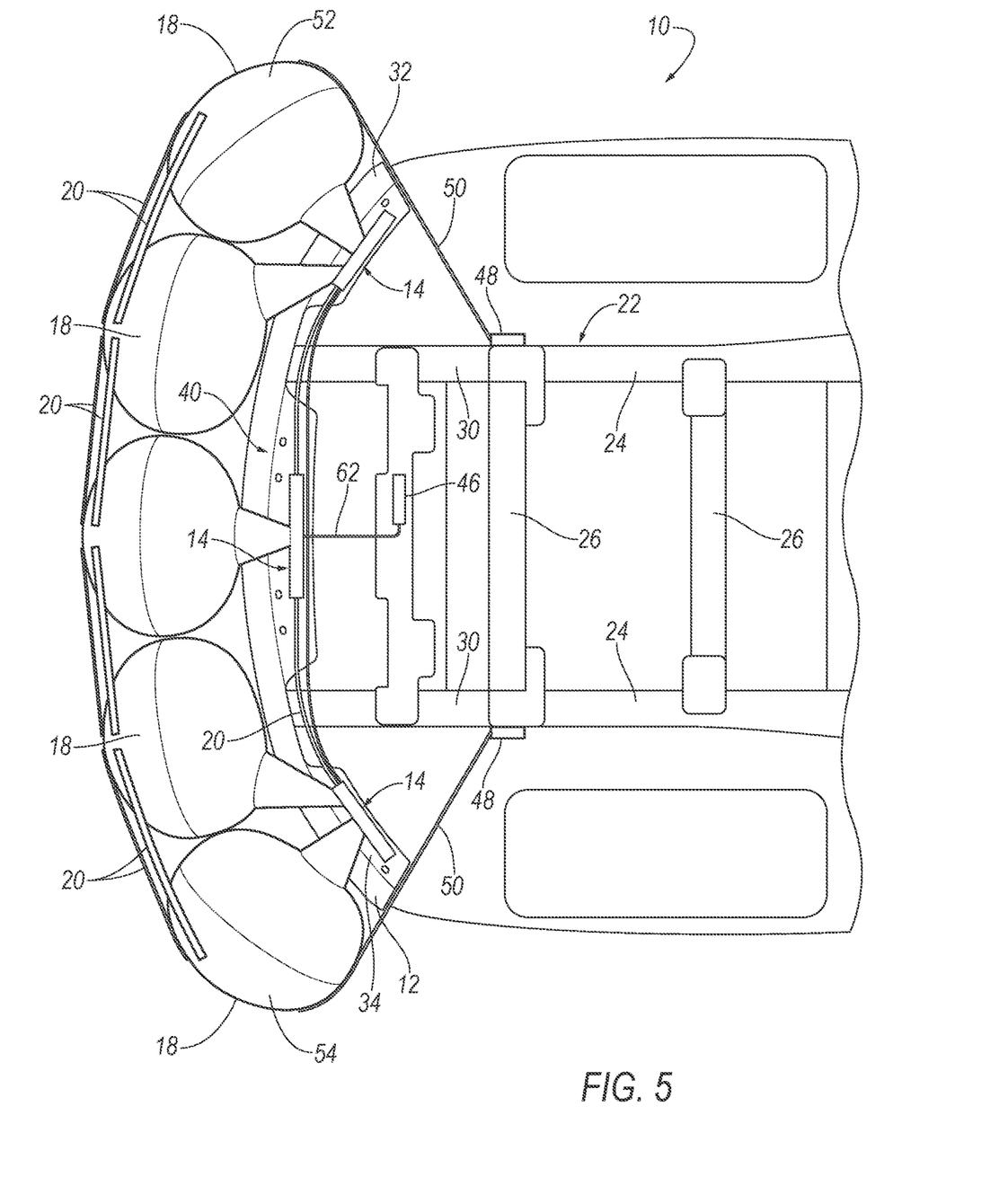
FIG. 5 is a bottom view of the vehicle with the airbag assemblies in the inflated position.
Figure 6:
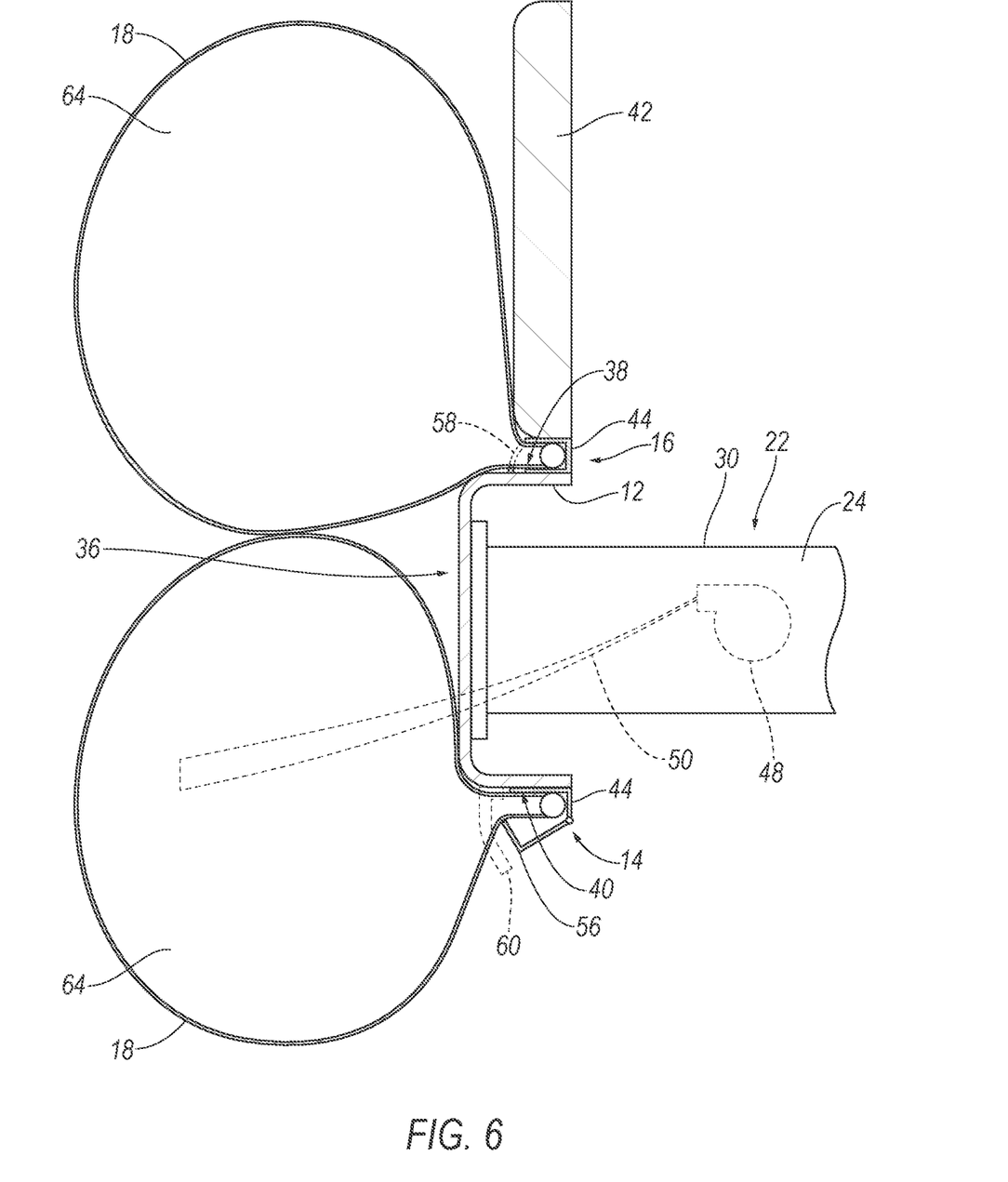
FIG. 6 is a cross-sectional view of the bumper assembly with the airbag assemblies in the inflated position.

With reference to FIGS. 4-6, the airbags 18 of the lower airbag assemblies 14 are inflatable below the vehicle bumper 12 and upwardly vehicle-forward of the vehicle bumper 12 from the uninflated position to the inflated position. When the airbags 18 of the lower airbag assembly 14 are in the inflated position, the airbags 18 are vehicle-forward of the front face 36 of vehicle bumper 12, i.e., the airbag 18 in the inflated position and the front face 36 of vehicle bumper 12 are in the same horizontal plane. As shown in FIGS. 4 and 6, the vehicle bumper 12 has a horizontal midline M elongated cross-vehicle and the airbags 18 in the inflated position extend upwardly above the horizontal midline M in the example shown in the Figures.

Since the lower airbag assemblies 14 are on the bottom face 40 of the vehicle bumper 12, the airbags 18 inflate below the vehicle bumper 12. The lower airbag assemblies 14 are designed to direct the airbag 18 vehicle-forward and upwardly. Specifically, components of the lower airbag assembly 14 and/or the design of the airbag 18 position the airbag 18 upwardly and vehicle-forward of the front face 36 of the vehicle bumper 12 from the uninflated position to the inflated position. As an example, the lower airbag assembly 14 may include a chute 56 that guides movement of the airbag 18 vehicle-forward and/or upwardly. In the example shown in the Figures, the chute 56 may be a component of the housing 44, as shown in FIG. 6. The chute 56 is designed to direct the respective airbag 18 in a vehicle-forward direction and upwardly during inflation. In the example in which the chute 56 is a component of the housing 44, the chute 56 may be rotatable relative to the rest of the housing 44 under the force of the airbag 18 during inflation. The chute 56 may be maintained in position in an open position, as shown in FIG. 6, by tethers, a locking hinge between the chute 56 and the rest of the housing 44, or any other suitable structure. In other examples, one or more chutes 56 may be fixed to the vehicle bumper 12, e.g., the bottom face 40, to guide movement of the airbag 18 during inflation. The chute 56 may be rigid relative to the airbag 18 to act as a reaction surface for the airbag 18 as the airbag 18 deploys from the uninflated position to the inflated position. The chute 56 may be plastic, metal, fiberglass or other suitable materials.

The airbags 18 of the upper airbag assembly 16 are arranged cross-vehicle and inflatable above the vehicle bumper 12 from an uninflated position to an inflated position. In the example shown in the Figures, each of the airbags 18 of the upper airbag assembly 16 are in one housing 44. In other examples, one or more upper airbag assemblies may include other airbags 18 and/or housings 44 spaced along the vehicle bumper 12.

The airbags 18 of the upper airbag assembly 16 are inflatable between the grill 42 and the vehicle bumper 12. The airbags 18 of the upper airbag assembly 16 are inflatable above the vehicle bumper 12 and downwardly vehicle-forward of the vehicle bumper 12 from the uninflated position to the inflated position, as shown in FIGS. 4 and 6. When the airbags 18 of the upper airbag assembly 16 are in the inflated position, the airbags 18 are vehicle-forward of the front face 36 of vehicle bumper 12, i.e., the airbag 18 in the inflated position and the front face 36 of vehicle bumper 12 are in the same horizontal plane. The upper airbag assembly 18 is designed to direct the airbag 18 vehicle-forward and downwardly. Specifically, components of the upper airbag assembly 16 and/or the design of the airbag 18 position the airbag 18 downwardly and vehicle-forward of the front face 36 of the vehicle bumper 12 from the uninflated position to the inflated position, e.g., with chutes 56, tethers, etc.

With reference to FIGS. 4-6, the airbags 18 of the upper airbag assembly 16 abut each other in the inflated position and the airbags 18 of the lower airbag assemblies 14 abut each other in the inflated position. The airbags 18 of the upper airbag assembly 16 abut the airbags 18 of the lower airbag assemblies 14 when the airbags 18 are in the inflated position.

When the airbags 18 of the lower airbag assemblies 14 and the upper airbag assembly 16 are in the uninflated position, the lower airbag assemblies 14 and the upper airbag assembly 16 may be concealed. For example, a trim piece 58 may cover the upper airbag assembly 16 between the grill 42 and vehicle bumper 12. The trim piece 58 is shown in FIG. 6 in broken lines to indicate the position of the trim piece 58 before inflation of the airbags 18. The lower airbag assemblies 14 may be concealed by an air dam 60. Specifically, the air dam 60 is vehicle-forward of the lower airbag assemblies 14 to prevent or obstruct view of the lower airbag assemblies 14. The air dam 60 is shown in FIG. 6 in broken lines to indicate the position of the air dam 60 before inflation of the airbags 18. The trim piece 58 and the air dam 60 are releasable from the vehicle bumper 12 under the force of inflation of the airbags 18.

At least one external tether 20 is fixed to two of the airbags 18 of the lower airbag assemblies 14 and at least one external tether 20 is fixed to two of the airbags 18 of the upper airbag assembly 16. The external tether 20 is external to the inflation chambers 64 of the airbags 18. The external tethers 20 are fixed to the respective airbags 18 in any suitable way, e.g., stitching, adhesive, bonding, welding, etc.

In the example shown in the Figures, the external tethers 20 extend between each of the adjacent airbags 18 of the lower airbag assembly 14 and the external tethers 20 extend between each of the adjacent airbags 18 of the upper airbag assembly 16. In other words, for the lower airbag assemblies 14, the airbags 18 and the external tethers 20 are in alternating arrangement in a cross-vehicle direction from the leftmost airbag 52 to the rightmost airbag 54. Similarly, for the upper airbag assembly 16, the airbags 18 and the external tethers 20 are in alternating arrangement in a cross-vehicle direction. In the example shown in the Figures, three external tethers 20 extend between adjacent airbags 18 of the upper airbag assembly 16 and are vertically spaced from each other.

In the uninflated position, the external tethers 20 extend along the vehicle bumper 12 between adjacent airbags 18. The external tethers 20 may supported at least in part on vehicle bumper 12 through the adjacent airbags 18. In some examples, the external tethers 20 may be retained to the vehicle bumper 12 by releasable retainers that retain the external tether 20 on the vehicle bumper 12 when the airbags 18 are in the uninflated position and release from the external tether 20 and/or the vehicle bumper 12 when the airbags 18 inflate to the inflated position.

With reference to FIGS. 4 and 5, in the inflated position, the external tether 20 extends from one of the two airbags 18 to the other of the two airbags 18 vehicle-forward of the vehicle bumper 12. The external tethers 20 maintain relative position of the airbags 18 relative to each other. In the event an object impacts the external tether 20 during certain vehicle impacts, the external tether 20 distributes load to the two airbags 18 to which the external tether 20 is fixed.

The airbags 18 of the upper airbag assembly 16 and the lower airbag assembly 14 may be of the same material type and may have different shapes, as described above. The airbags 18 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane. The external tethers 20 and/or the retractable tethers 50 may be fabric and may be of the same material type as the airbags 18.

As set forth above, bumper assembly 28 includes at least one inflator 46 to inflate the airbags 18. In the example shown in the Figures, the airbags 18 of the lower airbag assembly 14 and the upper airbag assembly 16 may share a common inflator 46, in which case the inflator 46 may be in fluid communication with the airbags 18 through fill tubes 62. In such an example, the fill tubes 62 and the inflator 46 are connected to the airbag assemblies 14, 16 and assembled to the vehicle 10 as a unit by connecting the inflator 46 to the rest of the vehicle 10 at the time of installation of the vehicle bumper 12 to the frame rails 24. In other examples, more than one inflator 46 may inflate the different airbag assemblies 14, 16, e.g., the lower airbag assembly 14 may include one inflator 46 and the upper airbag assembly 16 may include a separate inflator 46.

In some examples, the inflator 46 may be directly connected to the vehicle frame 22, e.g., with fasteners such as threaded fasteners, brackets, push-pins, Christmas-tree fasteners, etc. In the example shown in the Figures, the inflator 46 is connected directly to a radiator mount of the vehicle frame 22. In other examples, the inflator 46 may be directly connected to vehicle bumper 12.

The inflator 46 is operatively connected to the at least one of the airbags 18 for inflation to the inflated position. The inflator 46 expands the airbags 18 with inflation medium, such as a gas, to move the airbags 18 from the uninflated position to the inflated position. Specifically, the inflator 46 inflates the inflation chamber 64 of each airbags 18. The inflator 46 may be, for example, a pyrotechnic inflator 46 that ignites a chemical reaction to generate the inflation medium, a stored gas inflator 46 that releases (e.g., by a pyrotechnic valve) stored gas as the inflation medium, or a hybrid.

As set forth above, a tether retractor 48 fixed directly to the vehicle frame 22 and a retractable tether 50 extending from the tether retractor 48 to one of the airbags 18 of the lower airbag assemblies 14. In the example shown in the Figures, the vehicle 10 includes two tether retractors 48 and two retractable tethers 50. One of the tether retractors 48 is fixed directly to a right one of the frame rails 24 and the associated retractable tether 50 is fixed to the rightmost airbag 54, and the other of the tether retractors 48 is fixed directly to a left one of the frame rails 24 and the associated retractable tether 50 is fixed to the leftmost airbag 52.

The tether retractor 48 is operatively connected to the retractable tether 50 to retract the retractable tether 50. The tether retractor 48 may be pyrotechnically activated. In such an example, the tether retractor 48 may be any suitable type such as a rotary actuator, in which a pyrotechnic charge rotates a shaft connected to the retractable such that the retractable tether 50 wraps around the shaft; a piston linkage, in which the pyrotechnic charge for example, drives a piston attached to the retractable tether 50; a ball-in-tube linkage, in which an pyrotechnic charge propels a ball or balls over a cogwheel connected to the retractable tether 50; a mechanical linkage, in which a compressed spring attached to the retractable tether 50 is released; or any other suitable type.

The tether retractor 48 and the retractable tether 50 are above the bottom face 40 of the vehicle bumper 12 when the airbags 18 are in the inflated position, e.g., see FIG. 6, which shows the position of one of the tether retractors 48 and retractable tethers 50 in broken lines to illustrate relative position. In such an example, the tether retractor 48 pulls the airbag 18 of the lower airbag assembly 14 upwardly. This pins the airbags 18 of the lower airbag assembly 14 against the front face 36 of the vehicle bumper 12. The abutment of the airbags 18 of the lower airbag assembly 14 with the airbags 18 of the upper airbag assembly 16 also vertically position the airbags 18 of the lower airbag assembly 14.

Figure 7:
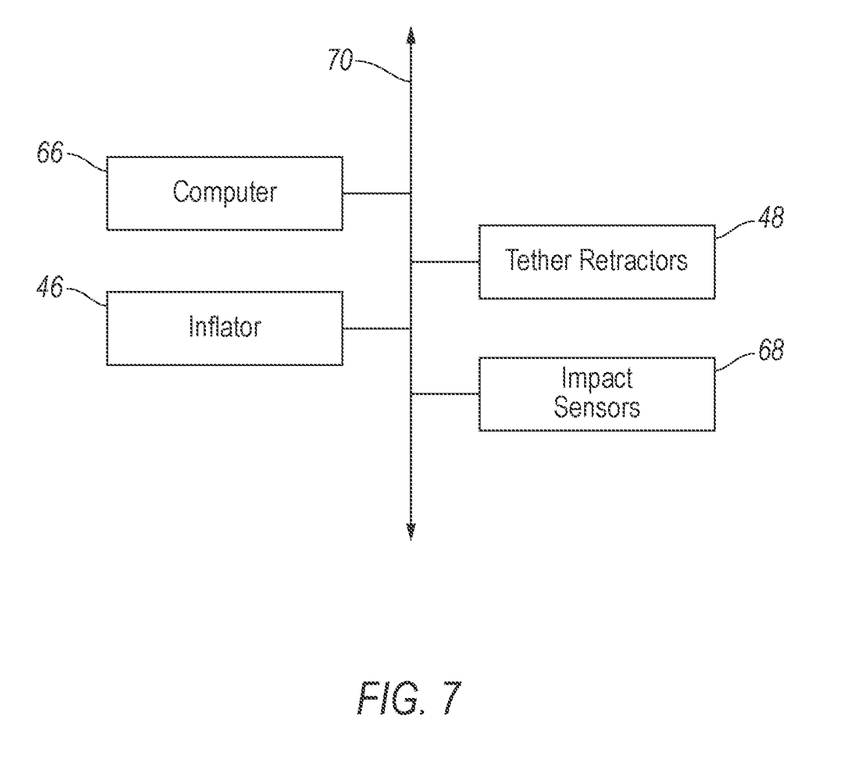
FIG. 7 is block diagram of a system of the vehicle.

With reference to FIG. 7, the vehicle 10 includes a computer 66 that controls the deployment of the deployable assemblies. The computer 66 may be, for example, a restraints control module. The computer 66 includes a processor and a memory. The memory includes one or more forms of computer readable media, and stores instructions executable by the processor for performing various operations, including as disclosed herein. For example, the computer 66 can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer. The memory can be of any type, e.g., hard disk drives, solid state drives, servers, or any volatile or non-volatile media. The memory can store the collected data sent from the sensors. The memory can be a separate device from the rest of the computer 66, and the computer 66 can retrieve information stored by the memory via a network in the vehicle 10, e.g., over a CAN bus, a wireless network, etc.

The vehicle 10 may include at least one impact sensor 68 for sensing certain vehicle impacts (e.g., impacts of a certain magnitude, direction, etc.), and the computer 66 in communication with the impact sensor 68 and the inflator 46. The computer 66 may activate the inflator 46, e.g., provide an impulse to a pyrotechnic charge of the inflator 46 when the impact sensor 68 senses certain vehicle impacts. The impact sensor 68 may be configured to sense certain vehicle impacts prior to impact, i.e., pre-impact sensing. The impact sensor 68 may be in communication with the computer 66. The impact sensor 68 is configured to detect certain vehicle impacts. In other words, a "certain vehicle impact" is an impact of the type and/or magnitude for which inflation of the airbag 18 is designed i.e., "certain" indicates the type and/or magnitude of the impact. The type and/or magnitude of such "certain vehicle impacts" may be pre-stored in the computer 66, e.g., a restraints control module and/or a body control module. The impact sensor 68 may be of any suitable type, for example, post contact sensors such as accelerometers, pressure sensors, and contact switches; and pre-impact sensors 68 such as radar, LIDAR, and vision sensing systems. The vision sensing systems may include one or more cameras, CCD image sensors, CMOS image sensors, etc. The impact sensor 68 may be located at numerous points in or on the vehicle 10. The vehicle 10 includes a communication network 70. The communication network 70 can include a bus in the vehicle 10 such as a controller area network (CAN) or the like, and/or other wired and/or wireless mechanisms. Via the network 70, the computer 66 may transmit messages to various devices in the vehicle 10 and/or receive messages (e.g., CAN messages) from the various devices, e.g., sensors, an actuator, a human machine interface (HMI), etc. Various controllers and/or sensors, including the impact sensors 68 may provide data to the computer via the vehicle 10 communication network.

Based on detection of certain vehicle impacts by the impact sensor 68, the computer 66 is programmed to command the inflator 46 (or inflators 46 in examples including more than one) to inflate the airbags 18 and to command the tether retractors 48 to retract the retractable tethers 50. The computer 66 may be programmed to first command activation of the inflator 46 and then command activation of the tether retractors 48 after a predetermined delay.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a vehicle frame;
   a vehicle bumper;
   a plurality of airbag assemblies each fixed directly to the vehicle bumper, each airbag assembly including an airbag inflatable below the vehicle bumper and upwardly vehicle-forward of the vehicle bumper from an uninflated position to an inflated position;
   the airbags including a leftmost airbag, a rightmost airbag, and at least one airbag between the leftmost airbag and the rightmost airbag;
   the airbag assemblies being spaced from each other when the airbags are in the uninflated position;
   external tethers each extending from one of the airbags to another of the airbags in the uninflated position, the airbags and the external tethers being in alternating arrangement in a cross-vehicle direction from the leftmost airbag to the rightmost airbag when the airbags are in the inflated position;
   at least one tether retractor fixed directly to the vehicle frame;
   a first retractable tether extending from the at least one tether retractor to the leftmost airbag; and
   a second retractable tether extending from the at least one tether retractor to the rightmost airbag;
   the at least one tether retractor being operatively connected to the first retractable tether and the second retractable tether to retract the first retractable tether and the second retractable tether.

2. The vehicle of claim 1, wherein the external tethers extend from one of the airbags to another of the airbags vehicle-forward of the vehicle bumper in the inflated position.

3. The vehicle of claim 1, wherein the vehicle bumper has a bottom face and the airbag assemblies are fixed directly to the bottom face of the vehicle bumper.

4. The vehicle as set forth in claim 2, wherein the vehicle bumper includes a bottom face and the retractable tether is above the bottom face of the vehicle bumper when the airbags are in the inflated position.

5. The vehicle as set forth in claim 1, wherein some of the external tethers extend between the same two airbags and are vertically spaced from each other.

6. The vehicle as set forth in claim 1, wherein the leftmost airbag extends vehicle-outboard of the leftmost end of the vehicle bumper and the rightmost airbag extends vehicle-outboard of the rightmost end of the vehicle bumper.

7. The vehicle as set forth in claim 6, wherein each airbag abuts adjacent ones of the airbags in the inflated position.

8. The vehicle as set forth in claim 1, wherein the vehicle bumper includes a bottom face, the first retractable tether and the second retractable tether being above the bottom face of the vehicle bumper when the airbags are in the inflated position.

9. The vehicle of claim 1, wherein each airbag assembly includes a chute designed to direct the respective airbag in a vehicle-forward direction during inflation.

10. The vehicle of claim 1, further comprising a second plurality of airbag assemblies each including airbags, the airbags of the second plurality of airbags being arranged cross vehicle and inflatable above the vehicle bumper from an uninflated position to an inflated position.

11. The vehicle of claim 10, wherein the airbags of the second plurality of airbag assemblies abut the airbags of the plurality of airbags when the airbags of the plurality of airbags are in the inflated position and the airbags of the second plurality of airbags are in the inflated position.

12. The vehicle of claim 10, further comprising a grill disposed above the vehicle bumper, the airbags of the second plurality of airbag assemblies being inflatable between the grill and the vehicle bumper.

13. The vehicle of claim 1, further comprising an inflator fixed directly to the vehicle frame and operatively connected to the at least one of the airbags for inflation to the inflated position.

14. The vehicle as set forth in claim 2, wherein the airbags are spaced from each other cross-vehicle in the uninflated position, and the external tethers are elongated cross-vehicle when the airbags are in the uninflated position and the inflated position.

15. The vehicle of claim 14, wherein the vehicle bumper has a bottom face and the airbag assemblies are fixed directly to the bottom face of the vehicle bumper.

\* \* \* \* \*